United States Patent
Cui

(10) Patent No.: US 9,470,433 B2
(45) Date of Patent: Oct. 18, 2016

(54) DUAL-RING AND STRAIGHT FIN TUBE CONDENSING

(71) Applicant: Suzhou CQ Heat Exchanger Co., Ltd., Suzhou Industrial Park (CN)

(72) Inventor: Shuqing Cui, Fitchburg, WI (US)

(73) Assignee: Suzhou CQ Heat Exchanger Co., Ltd., Jiangsu Province (CN)

( * ) Notice: Subject to any disclaimer, the term of this patent is extended or adjusted under 35 U.S.C. 154(b) by 0 days.

(21) Appl. No.: 14/387,433

(22) PCT Filed: Sep. 21, 2013

(86) PCT No.: PCT/CN2013/083872
§ 371 (c)(1),
(2) Date: Sep. 23, 2014

(87) PCT Pub. No.: WO2014/044204
PCT Pub. Date: Mar. 27, 2014

(65) Prior Publication Data
US 2015/0184888 A1      Jul. 2, 2015

(30) Foreign Application Priority Data
Sep. 21, 2012   (CN) .......................... 2012 1 0353624

(51) Int. Cl.
*F24H 8/00*   (2006.01)
*F24H 1/40*   (2006.01)
*F24H 9/00*   (2006.01)
(Continued)

(52) U.S. Cl.
CPC ............. *F24H 8/006* (2013.01); *F24H 1/14* (2013.01); *F24H 1/403* (2013.01); *F24H 8/00* (2013.01); *F24H 9/0084* (2013.01); *F24H 9/1836* (2013.01); *Y02B 30/102* (2013.01)

(58) Field of Classification Search
CPC ......................................................... F24H 8/00
USPC .............................. 122/31.1, 32, 367.1, 18.1
See application file for complete search history.

(56) References Cited

U.S. PATENT DOCUMENTS

| | | | | |
|---|---|---|---|---|
| 1,986,914 A | * | 1/1935 | Avery | F24H 1/28 122/149 |
| 5,687,678 A | * | 11/1997 | Suchomel | F24H 1/43 122/247 |
| 7,267,083 B2 | * | 9/2007 | Le Mer | F28D 7/024 122/18.1 |

(Continued)

FOREIGN PATENT DOCUMENTS

| | | |
|---|---|---|
| CN | 101017026 A | 8/2007 |
| CN | 102901221 A | 1/2013 |

(Continued)

*Primary Examiner* — Gregory A Wilson
(74) *Attorney, Agent, or Firm* — Baker & Hostetler LLP

(57) ABSTRACT

A heat exchanger for supplying heat includes a housing, a bundle of dual-ring, straight fin-coil tubes, and a flue channel. The housing includes a burner, a water inlet, a water outlet and a flue gas outlet. The burner is disposed on a top portion of the housing and connected to an air/gas mixture unit. The first group of fin tubes is disposed tightly, circularly, and coaxially around the burner. The flue channel is disposed below the burner and is formed by a second group of fin tubes. A flow of flue gas vents from the flue channel to the flue gas outlet. The water inlet is connected to the first group of fin tubes which forms the flue channel below the burner. The second group of fin tubes below the burner is connected to the first group of fin tubes. The first group of fin tubes is connected to the water outlet.

8 Claims, 5 Drawing Sheets

(51) Int. Cl.
*F24H 1/14* (2006.01)
*F24H 9/18* (2006.01)

(56) References Cited

U.S. PATENT DOCUMENTS

| | | | | |
|---|---|---|---|---|
| 7,281,497 | B2* | 10/2007 | Le Mer | F24H 1/43 122/18.1 |
| 7,302,916 | B2* | 12/2007 | LeMer | F24H 1/43 122/15.1 |
| 7,824,178 | B1* | 11/2010 | Putnam | F23D 14/36 122/134 |
| 7,909,005 | B2* | 3/2011 | Le Mer | F24H 1/43 122/18.1 |
| 8,656,867 | B2* | 2/2014 | Deivasigamani | F24H 1/44 122/15.1 |
| 2012/0312513 | A1* | 12/2012 | Le Mer | F24H 1/43 165/159 |
| 2015/0300687 | A1* | 10/2015 | Cui | F24H 1/403 126/110 R |

FOREIGN PATENT DOCUMENTS

| | | |
|---|---|---|
| CN | 102901222 A | 1/2013 |
| CN | 102901223 A | 1/2013 |
| CN | 202813775 U | 3/2013 |
| CN | 202928095 U | 5/2013 |
| CN | 202928096 U | 5/2013 |
| FR | 2636125 A1 | 3/1990 |

* cited by examiner

DUAL-RING AND STRAIGHT FIN TUBE CONDENSING

CROSS REFERENCE TO RELATED APPLICATIONS

This application is a national stage application and claims priority to PCT/CN2013/083872, filed on Sep. 21, 2013, which claims priority to CN 201210353624.2, filed on Sep. 21, 2012, the disclosures of which are incorporated herein by reference in their entireties.

FIELD OF THE INVENTION

This invention relates generally to equipment in the heating industry field. More particularly, the invention is related to a forced convection dual-ring, straight fin tube condensing heat exchanger for supplying heat.

BACKGROUND OF THE INVENTION

As far back as the Middle East oil crisis in the in 20th century, to save the energy, the high efficient condensing boiler was developed in Europe. The outstanding feature of the boiler is that the efficiency is 10% higher than the conventional boiler. Abundant water vapor in the flue is condensed and releases the latent heat of vaporization because the flue temperature can be decreased to below the dew point. This has the effect of energy saving. The condensing heat exchanger is developed and designed based on the principle of the condensing boiler.

The heat exchanger of the conventional (non-condensing) boiler is made by carbon steel or cast iron. The flue temperature is higher than 150° C. normally. The heat exchanger is not designed to absorb the sensible and latent heat when the water vapor condenses, and there is no condensate.

The condensing boiler is high efficient boiler with the features of energy saving and environmental protection. It is the future of the boiler industry and has been widely used. The life the condensing boiler will be shortened significantly if the carbon steel or cast iron is used because the boiler generates a lot of acid condensing water. So the material of the condensing heat exchanger should be stainless steel or cast aluminum. At present, most condensing heat exchangers are made with stainless steel tube or cast aluminum.

It is a proven technology to make cast aluminum heat exchanger, but the capacity is limited. It is very difficult to make the big cast aluminum parts. Typically, the bigger the cast, the higher the mold cost, the more complex manufacturing process and the higher scrap rate.

The efficiency can be around 96% maximally by using stainless steel or cast aluminum.

There will be no condensing water if the return water temperature is higher than 60° C. At this point, only the sensible heat in the flue can be saved. The heat efficiency of the non-condensing boiler is only around 87%.

The air pre-heater is applied in the large boiler in power stations normally. There is no such application in the heating boiler.

The conventional heat exchangers are designed according to the requirements from the different customers and the sizes of the heat exchangers are varied very much according to these requirements. Because there are a lot of components involved in the manufacture of heat exchangers, manufacturing many sizes of heat exchangers is not good practice for mass production.

While conventional heat exchangers have relatively good performance, there is still room for significant improvements in performance. A specific list of technical problems in need of improvement include: dead zones of flue flow and insufficient heat exchanging because of the poor heat exchanger structure design; increase the flue side heat transfer surface and efficiency by improving the heat transfer structure; to make the size smaller under the same heat transfer output; to integrate an air pre-heater into the heat exchanger to get the opportunity of third heat exchanging; increase the temperature of the inlet air; and decrease the flue temperature further. Accordingly, there is a need in the art to improve the heat exchanger.

SUMMARY OF THE INVENTION

The foregoing needs are met, to a great extent, by the present invention, wherein aspects of a heat exchanger are provided.

The technical problems that need to be solved include: dead zones of flue flow and insufficient heat exchanging because of the poor heat exchanger structure design; increase the flue side heat transfer surface and efficiency by improving the heat transfer structure; to make the size smaller under the same heat transfer output; to integrate an air pre-heater into the heat exchanger to get the opportunity of third heat exchanging; and increase the temperature of the inlet air and decrease the flue temperature further.

In order to solve the above technical problems, this invention provides the following solutions: A forced convection dual-ring, straight fin-tube coils condensing heat exchanger including: heat exchanger housing, the burner, and first group of fin tubes inside the housing, water inlet, water outlet, and flue gas outlet on the housing. Burner is connected to the air fuel mixer unit. The burner is located in the upper portion of the heat exchanger housing. A first group of fin tubes are installed around the burner tightly and coaxially. Below the burner, the cylindrical flue channel formed by another first group of fin tubes. The flue gas flows along the flue channel to flue outlet. The water inlet is connected to the bundle coils which forms flue channel below the burner. This bundle coils below the burner are soldered, brazed, welded or otherwise connected to another bundle coils around the burner. Then connected to the water outlet of the heat exchanger. In some examples, this and other connection may be operable to convey thermal energy across the connection. For example, any of the various connections may include soldered, brazed, or welded joints. In other examples, the connection may include various fasteners.

As one preference option of the dual-ring straight fin tubes condensing heat exchanger for supplying heat in this invention, a group of straight fin tubes are installed around the burner tightly and coaxially. The cylindrical flue channel is formed by another group of straight fin tubes below the burner.

As one preference option of the dual-ring straight fin tube condensing heat exchanger for supplying heat in this invention, it has the character: Make the fins bent for some angles along with the tube axial by bending or squeezing, and to arrange the fin tubes next to each other closely and tightly.

As one preference option of the dual-ring straight fin tubes condensing heat exchanger for supplying heat in this invention, it has the character: There are flue baffles outside the circular fin tubes around the burner.

As one preference option of the dual-rings straight fin tubes condensing heat exchanger for supplying heat in this invention, it has the character: The cross section of the flue baffle is "V" type with radian, fitting with the fins of the fin tubes. The interfaces of the fin tubes in circle are staggered with the openings between the flue baffles.

As one preference option of the dual-rings straight fin tube condensing heat exchanger for supplying heat in this invention, it has the character: under the burner, an inner flue baffle is installed inside the cylindrical flue channel that is formed by a group of straight fin tubes; the inner cylindrical flue baffle is placed inside the flue channel adjacent to the group of fin tubes. The interfaces of the fin tubes in circle are staggered with the openings on the flue baffle.

As one preference option of the dual-rings straight fin tubes condensing heat exchanger for supplying heat in this invention, it has the character: An air preheater is installed within said cylindrical flue channel.

As one preference option of the dual-rings straight fin tubes condensing heat exchanger for supplying heat in this invention, it has the character: The air pre-heater is located inside and along the flue channel, and connected with air inlet. The flue exhaust is a 4-way connector, the flue exhaust on the top, the condensate outlet at the bottom and the air inlet in the middle.

As one preference option of the dual-rings straight fin tubes condensing heat exchanger for supplying heat in this invention, it has the character: the air pre-heater inside the flue channel is one or several cuboids or cylinder air inlet tube.

As one preference option of the dual-rings straight fin tubes condensing heat exchanger for supplying heat in this invention, it has the character: A burner is located at the lower part of the housing. A group of straight fin tubes are mounted closely next to each other and around the burner. Above the burner, a flue channel is formed by a group of fin tubes. The flue vents from the flue channel to flue outlet. Water inlet is connected to the group of straight fin tubes which forms flue channel above the burner, this group of straight fin tube are connected to another group of straight fin tubes around the burner and then connected to the water outlet.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
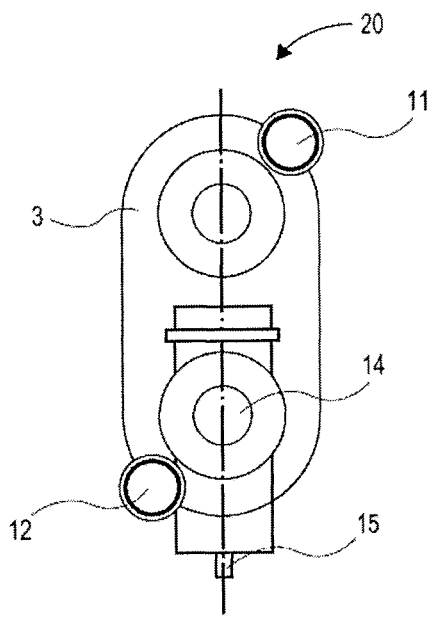
FIG. 1 is a right side view of a forced convection dual-rings fin tube condensing heat exchanger for supplying heat according to an embodiment of the invention.

Various embodiments of the present invention provide for an increase the heat exchanger efficiency of a heat exchanger. In embodiments of this invention the heat exchanger has a counter flow design with two-stage heat exchanger. The burner is on the top and the flue outlet on the bottom. After burning, the combustion flue gas flows through the group of fin tubes around the burner and flue baffles located outside these tubes first, then it flows through the serpentine bent fin tubes above the flue channel and the flue baffles under these tubes. Thereafter, the flue gas flows out from the flue outlet along the flue channel and counter flow with inlet air. The water inlet is close to the flue outlet at the bottom, and the water outlet is on the top of the heat exchanger. The water flows through inlet, fin tubes, and the cavities connected to the upper and lower fin tube bundles at both ends, such as front and rear water manifolds, and then out from the outlet. The boiler water supply temperature is higher than exhaust flue temperature by applying this type of count flow structure. In this way, the heat transfer efficiency and the amount of available heat are both able to be increased.

The fin tubes with the bent fins, fabricated in an additional process are able to increase the heat exchange efficiency significantly in this invention. The fin tube is as the basic element in the forced convection condensing heat exchanger. The heat transfer surface at flue side is increased by adding the fins on the external of the heat exchanger tube. The enhanced heat transfer at flue side increases the heat exchange efficiency, and makes the whole heat exchanger smaller. By the additional manufacturing process on the fins, for example bending, squeezing or cutting, the distance between tubes could be made smaller. Therefore, this makes flue gas have more contact with tubes, adds gas flue turbulences, increase heat transfer and heat exchanger efficiency, which in turn makes heat exchanger smaller. While controlling distance between the flame and the heat exchanger surface to reduce the flame temperature, thereby enabling to reduce nitrous oxide (NOX) emissions under 30 parts per million (PPM).

There are flue baffles outside the circular fin-tubes bundle around the burner and flue baffles inside the fin-tubes bundle formed the cylindrical flue channel. It is good to eliminate the "dead zone" on the flue path and improve the flue distribution on the shell side. In embodiments of this invention, the flue baffles force the flue gas flow along the fins and cross bare tubes very closely, therefore it enhances the heat transfer, and improve flue flow distribution at the shell side. The "dead zone" and "short circuit" at the flue flow path is decreased markedly.

Another additional device is the air pre-heater in embodiments of this invention. It can also increase the efficiency. In embodiments of this invention, the air pre-heater is integrated inside the flue channel of the heat exchanger. When the outdoor temperature is below −20° C. in the winter, the waste heat in the flue warms the coming air. Meanwhile, it decreases the exhaust flue temperature further, and the efficiency of the boiler could reach 96%-98% or more.

The following is specific description of the implementation case. The mentioned implementation case is shown in the attached figures. These figures are used to demonstrate and explain embodiments of the invention, but not to set the limitation to the invention.

As shown in FIG. 1 through FIG. 12, a heat exchanger 20 has the following major components: A front water manifold 1, a front shell 2, a shell 3, a fin tube bundle that may be either a circular fin tube bundle 4C or a straight fin tube bundle 4S, an outer baffle 5, a burner 6, an inner baffle 7, a rear water manifold 8, a rear shell 9, an air pre-heater 10, a water outlet 11, a water inlet 12, a flue exhaust 13, an air inlet 14, a condensing water outlet 15, a cylindrical flue channel 16, and a flue channel formed with a circular fin tube bundle 17C or a straight fin tube bundle 17S.

Figure 2:
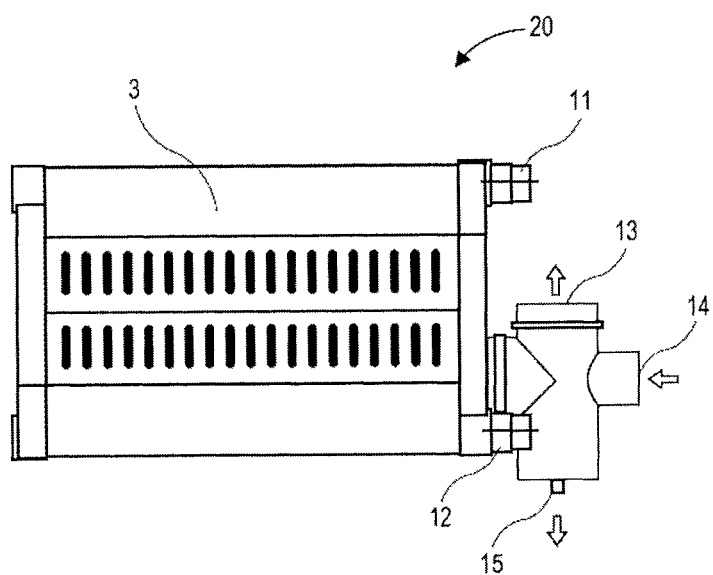
FIG. 2 is a front view of the forced convection dual-rings fin tube condensing heat exchanger for supplying heat according to the embodiment of FIG. 1.
Figure 3:
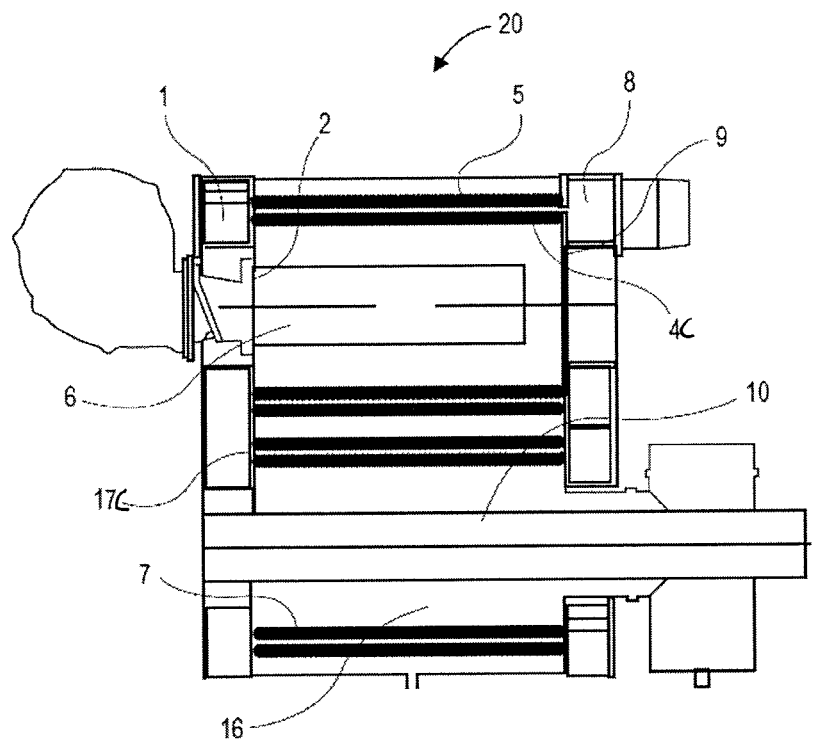
FIG. 3 is a cross sectional view of the forced convection dual-rings fin tube condensing heat exchanger for supplying heat according to the embodiment of FIG. 1.

Refer to FIG. 1 to FIG. 3; embodiments of the invention describe one case of a forced convection dual-rings fin tubes condensing heat exchanger 20 for supplying heat. As shown in FIGS. 1, 2 and 3, a forced convection dual-rings fin tubes condensing heat exchanger 20 for supplying heat includes the shell 3, the burner 6, the circular fin tube bundle 4C and the circular fin tube bundle 17C that forms the flue channel. The elliptic shell 3 may be welded with two pieces of "U" type plates. The front shell 2 and rear shell 9 are welded to the elliptic shell 3.

As shown in the figures, there is the front water manifold 1 outside the front shell 2; and there is the rear water manifold 8 outside the rear shell 9. There is a water outlet 11 and a water inlet 12 on the rear water manifold 8.

Figure 5:
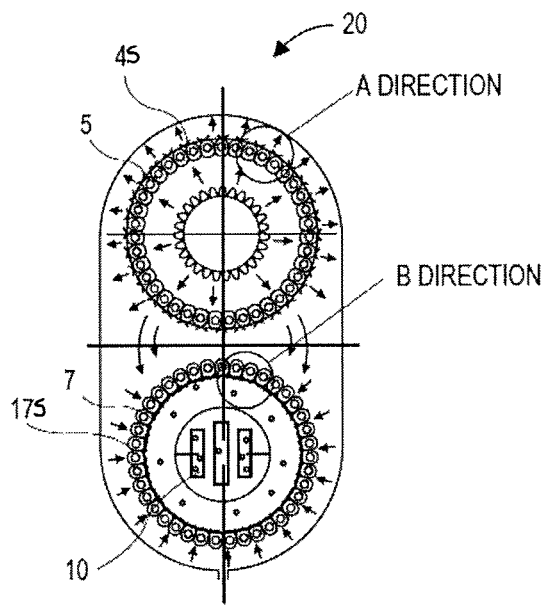
FIG. 5 is a right side sectional view of the forced convection dual-rings fin tube condensing heat exchanger for supplying heat with three air pre-heater pipes according to the embodiment of FIG. 1.

Refer to FIG. 5, the set of circular fin tube bundle 4C is around the burner 6 coaxially, and these tubes are tight close next to each other. Both ends of the circular fin tube bundle 4C and another circular fin tube bundle 17C forming the flue channel are welded to the front shell 2 and rear shell 9, as well as welded to the front water manifold 1 and rear water manifold 8. The circular fin tube bundle 17C forms the flue channel 16. The water heating circuit consists of water inlet 12, the circular fin tube bundle 17C, the front water manifold 1, the circular fin tube bundle 4C, the rear water manifold 8 and water outlet 11.

The circular fin tube bundle 4C is located straight above the circular fin tube bundle 17C. Preferably, the circular tube bundle 4C and the tubes bundle 17 are in parallel.

The burner 6 is coaxially located inside the circular fin tube bundle 4C and the burner 6 is connected to the air/gas inlet.

The outer flue baffles 5 are installed outside the circular fin tube bundle 4C by spot welding. The outer flue baffles 5, which mate or perfectly fit with the outside shape of the circular fin tube bundle 4C, is a long striped "V" type plate with radian cross section. The interfaces between fin tubes are staggered with the gaps of the outer flue baffles 5.

The inner cylindrical flue baffle 7 is coaxially mounted within the circular tube bundle 17C that forms the flue channel 16. There is a plurality of lines of holes and/or slots. The interfaces of the fin tubes in circle are staggered with the openings on the flue baffle 7. The flue baffle 7 is arranged closely adjacent to the circular tube bundle 17C by expansion or welding of course.

The forced convention dual-rings fin tubes heat exchanger 20 may further include the air preheater 10, which is mounted coaxially within the exhaust flue channel 16.

Figure 4:
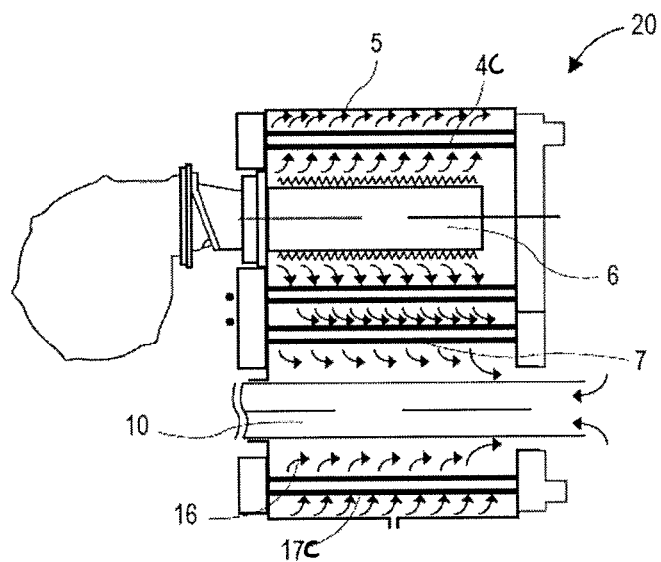
FIG. 4 is an operation (flow path) view of the forced convection dual-rings fin tube condensing heat exchanger for supplying heat according to the embodiment of FIG. 1.

As shown in FIG. 4, the operation principle of the forced convection dual-rings fin tube condensing heat exchanger 20 for supplying heat is demonstrated. Two stage heat exchanging method is applied in embodiments of this invention. The heat exchanger 20 uses the counter flow structure. The high temperature flue flows downstream through the circular fin tube bundle 4C and the circular fin tube bundle 17C. However, the water flow is opposite to the direction of the flue. It goes through the circular fin tube bundle 17C firstly, and then the circular fin tube bundle 4C. The air pre-heater 10 is located in the flue channel 16. The air gains the heat from the flue further. Therefore, the temperature of the air, which enters the combustion chamber, is increased, and at the same time, the flue temperature can be further reduced.

Figure 6:
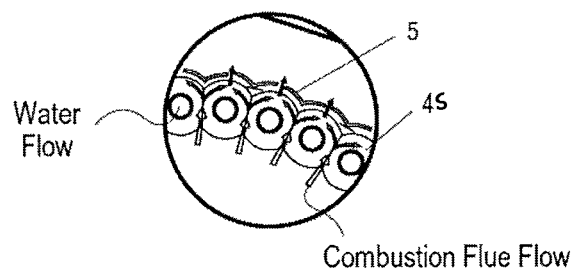
FIG. 6 is a view of Zoom A according to the embodiment of FIG. 5.
Figure 7:
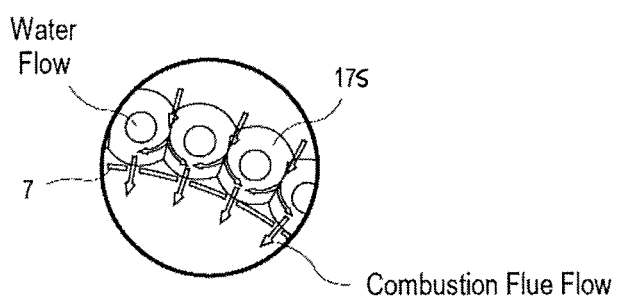
FIG. 7 is a view of Zoom B according to the embodiment of FIG. 5.

FIG. 5 to FIG. 7 show the operation principle of an embodiment of the forced convection dual-rings fin tube condensing heat exchanger 20 including three air preheater pipes for supplying heat. FIG. 6 is the Zoom A Direction in this invention, and FIG. 7 is the Zoom B Direction in this invention. In this case, the heat exchanger 20 consists of the housing 3, the burner 6 and many fin tubes within the housing 3. In addition, the housing 3 includes the water inlet 12, the water outlet 11 and the flue exhaust 13. The burner 6 is connected with the air/gas inlet and located in the upper portion of the housing 3. A straight fin tube bundle 4S is installed around the burner 6 tightly and coaxially. The cylindrical flue channel 16 is formed by another straight fin tube bundle 17S below the burner. The flue gas flows along the flue channel to flue outlet 13. Water inlet 12 is connected to the straight fin tube bundle 17S which forms flue channel below the burner, this group of straight fin tube are connected to the straight fin tube bundle 4S around the burner 6 and then connected to the water outlet 11.

In this embodiment, the burner 6 is circled coaxially by a group of straight fin tube bundle 4S that rest closely next to each other. Below the burner 6 is another group of straight fin tube bundles that form a cylindrical exhaust flue channel 16. The air preheater 10 could be one or more rectangular or cylindrical air intake pipe, located within the cylindrical flue exhaust channel 16.

Embodiment of invention use the counter flow structure, and the high temperature flue flows downstream through the first stage sensible heat transfer and the second stage latent heat transfer. However, the water flow is opposite to the direction of the flue. It goes through the circular fin tubes bundle 17 firstly, and then the circular fin tube bundle 4C. The water enters the secondary condensing heat exchanger 20 to absorb flue waste heat, and then enters the first stage to absorb high temperature sensible heat. The air pre-heater 10 located in flue channel 16 makes third heat transfer. The air gains the heat from the flue further. Therefore, the temperature of the air, which enters the combustion chamber, is increased; and at the same time, the flue temperature can be further reduced.

As shown the position of the straight fin tube bundles 4S, the exhaust flue channel 16, the outer flue baffle 5 and the inner flue baffle 7, the flue gas flows closely around the fin tubes by setting the outer baffle 5 and inner flue baffle 7, improves the shell-side fluid distribution significantly, reducing the flue gas flow "dead zone" or "short circuit". This forced the flue gas to have sufficient contact and more heat transfer with fin tubes.

Figure 8:
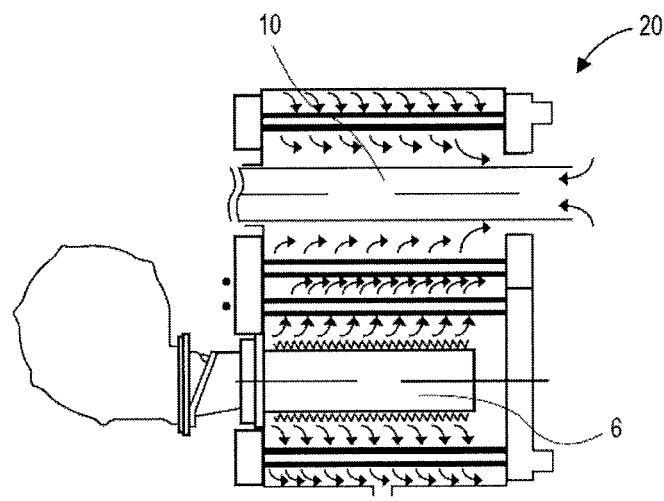
FIG. 8 is a cross sectional view of a forced convection dual-rings fin tube condensing heat exchanger for supplying heat with the burner located at the bottom according to another embodiment.
Figure 9:
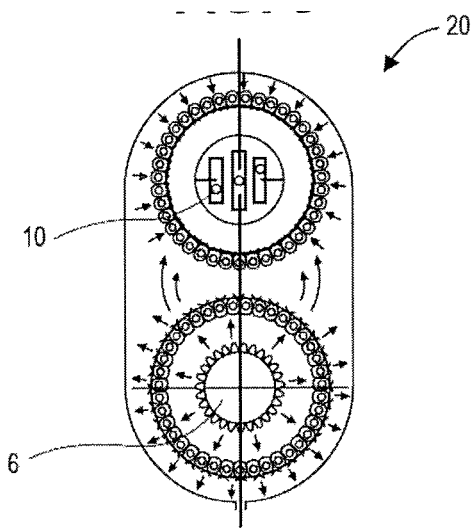
FIG. 9 is an operation (flow path) view of a forced convection dual-rings fin tube condensing heat exchanger for supplying heat with the burner located at the bottom according to another embodiment.

FIG. 8 is the sectional view of the forced convection dual-rings fin tube condensing heat exchanger 20 for supplying heat with the burner located at the bottom. FIG. 9 is the operation (flow path) view of the forced convection dual-rings fin tube condensing heat exchanger 20 for supplying heat with the burner located at the bottom. In this case, the burner 6 is located in the lower portion of the housing 3. A straight fin tube bundle 4S is installed around the burner 6 tightly and coaxially. The cylindrical flue channel 16 is formed by another straight fin tubes bundle 17 above the burner. The flue gas flows along the flue channel 16 to flue outlet 13. Water inlet 12 is connected to the group of straight fin tubes 17 which forms the flue exhaust channel, this group of straight fin tube are connected to the straight fin tube bundle 4S around the burner 6 and then connected to the water outlet 11.

The high temperature flue flows upstream and passes through the circular fin tube bundle 4C, and the circular fin tube bundle 17C which forms the flue exhaust channel. The air pre-heater 10 located inside the flue exhaust channel 16 exchange heat with the flue.

Figure 10:
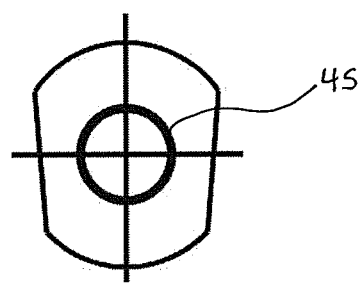
FIG. 10 is a front body view of the fin tube with bent fins for the circular fin tubes bundle according to an embodiment.
Figure 11:
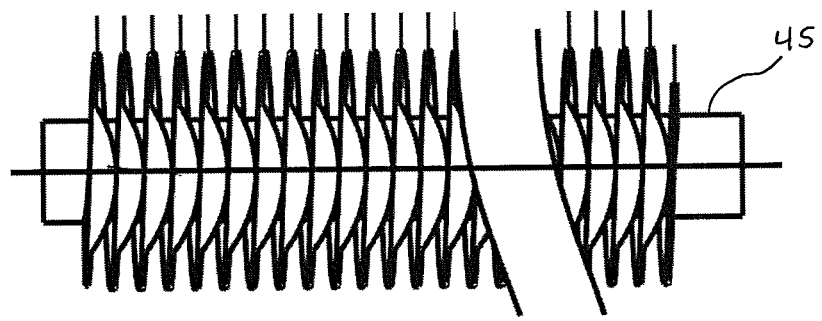
FIG. 11 is a left view of the fin tube with bent fins for the circular fin tube bundle according to an embodiment.

FIG. 10 is the main view of the treated fin tube for the circular fin tube bundle 4C. FIG. 11 is the side view of the treated fin tube. In an embodiment, the fins are bent or squeezed at about 90 degree along with the tube axially, and two bending lines also form a predetermined angle. The direction and angle of bended fins can be adjusted appropriately according to the request of the fin tubes arrangement, and the treated fin tubes are arranged to form a circular fin tube bundle 4C.

According to the specific production requirements, the manufacturing process of bending or squeezing fins can be selected to reduce the distance between the tubes next to each other.

Figure 12:
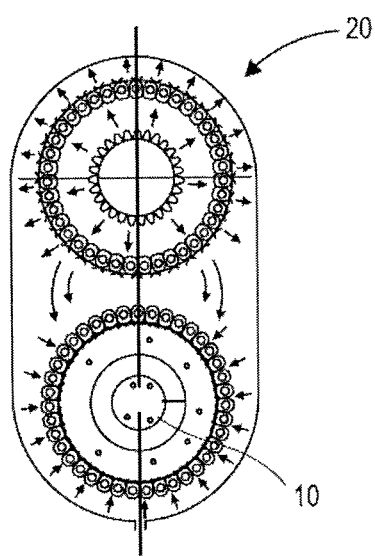
FIG. 12 is a right side cross sectional view of a forced convection dual-rings fin tube condensing heat exchanger for supplying heat with an air pre-heater pipe according to another embodiment.

FIG. 12 is a sectional right side view of the forced convection dual-rings fin tube condensing heat exchanger 20 for supplying heat with a pipe air preheater 10.

In conclusion, the purpose of this invention is to increase the heat transfer area and improve the structure of the heat transfer surface, therefore to increase heat exchange efficiency. The heat exchanger 20 uses the bended fin tube as the basic element of the forced convection fin tube condensing heat exchanger 20 for supplying heat. It enhances the heat exchange on the flue side and makes the whole heat exchanger 20 smaller.

The flow of the flue is guided very close to the fins and tubes with the application of the outer flue baffles 5 and the inner flue baffle 7. They improve shell side flue passes and velocity distribution, therefore enhance heat exchange. The "dead zone" and "short circuit" of the flue flow can be reduced very much. The air pre-heater 10 is integrated into the heat exchanger 20 very clever. The wasted heat of the flue could warm the entered cold air, and at the same time the flue is cooled down further. When the outdoor temperature is below −20° C. in winter, the efficiency could reach 96%~98% or more.

Some key components are designed to be the same to minimize the number of parts in this invention. This will help the mass production, improve the manufacturing process and save the cost.

It shall point out that the demonstration cases above are only for explaining the technical schemes of embodiments of the invention, not for limiting them. Although the detailed explanations are listed with only optimum cases in embodiments of the invention, the technical persons in this field shall know that the technical scheme can be modified and replaced, but it does not separate from the spirit in this invention, and shall be included in the scope of the claims.

The many features and advantages of embodiments of the invention are apparent from the detailed specification, and thus, it is intended by the appended claims to cover all such features and advantages of embodiments of the invention which fall within the true spirit and scope of embodiments of the invention. Further, since numerous modifications and variations will readily occur to those skilled in the art, it is not desired to limit embodiments of the invention to the exact construction and operation illustrated and described, and accordingly, all suitable modifications and equivalents may be resorted to, falling within the scope of embodiments of the invention.

What is claimed is:

1. A heat exchanger for supplying heat, comprising:
   a housing includes:
      a burner;
      a water inlet;
      a water outlet; and
      a flue gas outlet;
   the burner is disposed on a top portion of the housing and connected to an air/gas mixture unit;
   a first group of fin tubes are disposed tightly, circularly, and coaxially around the burner;
   a flue channel is disposed below the burner, the flue channel being formed by a second group of fin tubes, wherein a flow of flue gas vents from the flue channel to the flue gas outlet;
   an air pre-heater disposed inside the flue channel, wherein the air pre-heater is located inside and along the flue channel and connected with an air inlet;
   a flue exhaust being a 4-way connector, wherein the flue exhaust is disposed on atop portion of the heat exchanger;
   a condensate outlet disposed at a bottom portion of the heat exchanger and the air inlet being disposed in a middle portion of the heat exchanger;
   the water inlet is connected to the second group of fin tubes which forms the flue channel below the burner;
   the second group of fin tubes below the burner are connected to the first group of fin tubes; and
   the first group of fin tubes are connected to the water outlet.

2. The heat exchanger according to claim 1, wherein flue channel is a cylindrical exhaust flue channel.

3. The heat exchanger according to claim 1, wherein a plurality of fins on the first group of fin tubes are bent at a predetermined angle and respective surfaces of the plurality of fins are parallel or at a predetermined angle.

4. The heat exchanger according to claim 1, further comprising:
a plurality of outer flue baffles installed around the first group of fin tubes.

5. The heat exchanger according to claim 4, wherein the outer flue baffle include a "V" type cross section with a radiused portion configured to mate with ones of the fins of the first group of fin tubes and wherein the interfaces of the first group of fin tubes is disposed in a circle that are staggered with the openings between the plurality of outer flue baffles.

6. The heat exchanger according to claim 1, further comprising:
an inner flue baffle disposed below the burner is installed inside the flue channel adjacent to the first group of fin tubes and the interfaces of the fin tubes in the circle are staggered with the openings on the flue baffle.

7. The heat exchanger according to claim 1, wherein the air pre-heater disposed inside the flue channel includes one or more cuboidal or cylindrical air inlet tubes.

8. A heat exchanger comprising:
a housing having a flue gas outlet and a water outlet;
a burner disposed in a lower portion of the housing;
a group of straight fin tubes are mounted adjacent to each other around the burner;
a flue gas channel is disposed above the burner, the flue gas channel being formed by a group of fin tubes, wherein a flow of flue gas is vented from the flue gas channel to the flue gas outlet;
an air pre-heater disposed inside the flue gas channel, wherein the air pre-heater is located inside and along the flue gas channel and connected with an air inlet;
a flue exhaust being a 4-way connector, wherein the flue exhaust is disposed on a top portion of the heat exchanger;
a condensate outlet disposed at a bottom portion of the heat exchanger and the air inlet being disposed in a middle portion of the heat exchanger; and
a water inlet connected to the group of straight fin tubes, wherein the group of straight fin tubes are connected to a second group of straight fin tubes which are then connected to the water outlet.

* * * * *